UNITED STATES PATENT OFFICE.

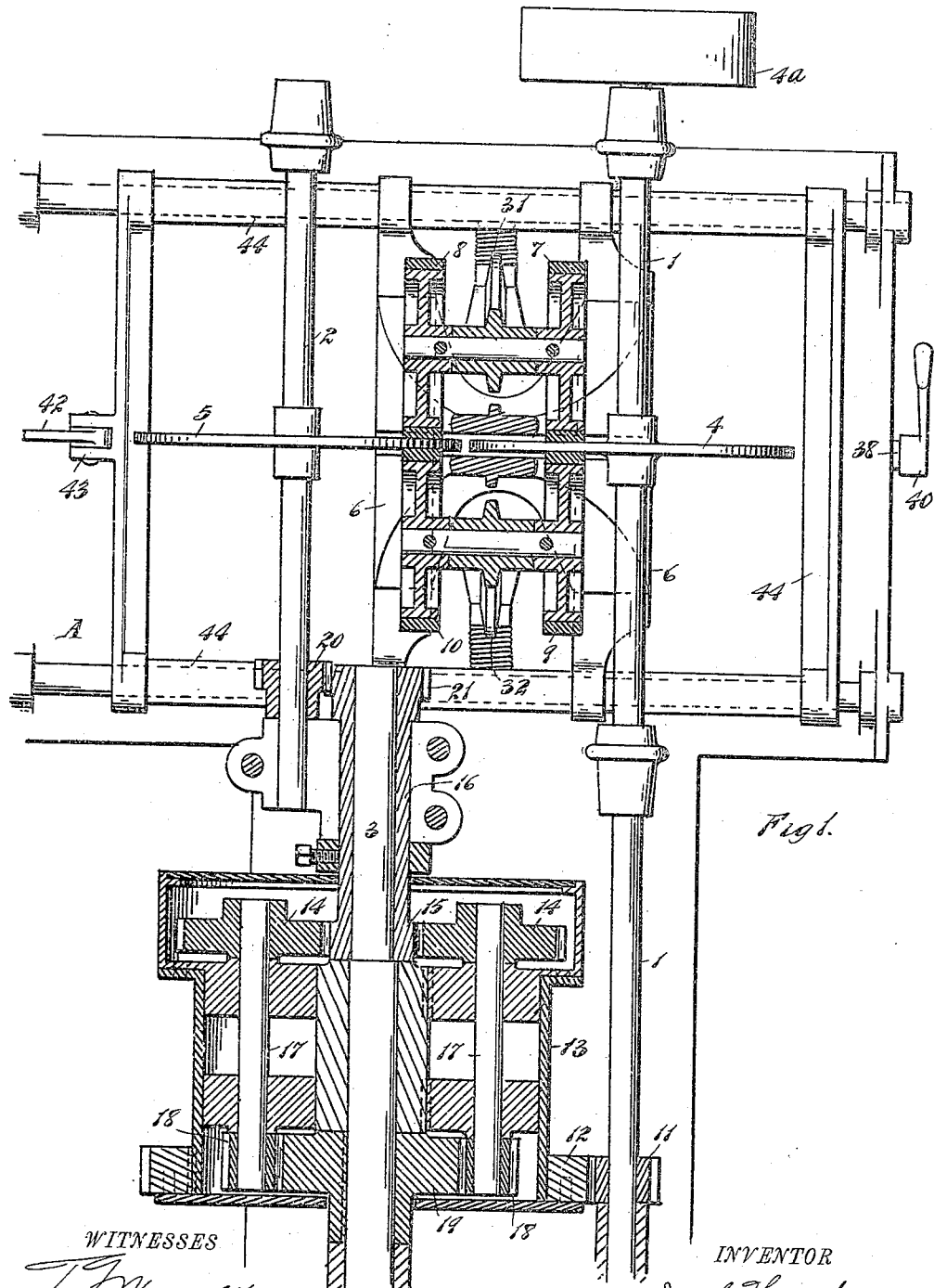

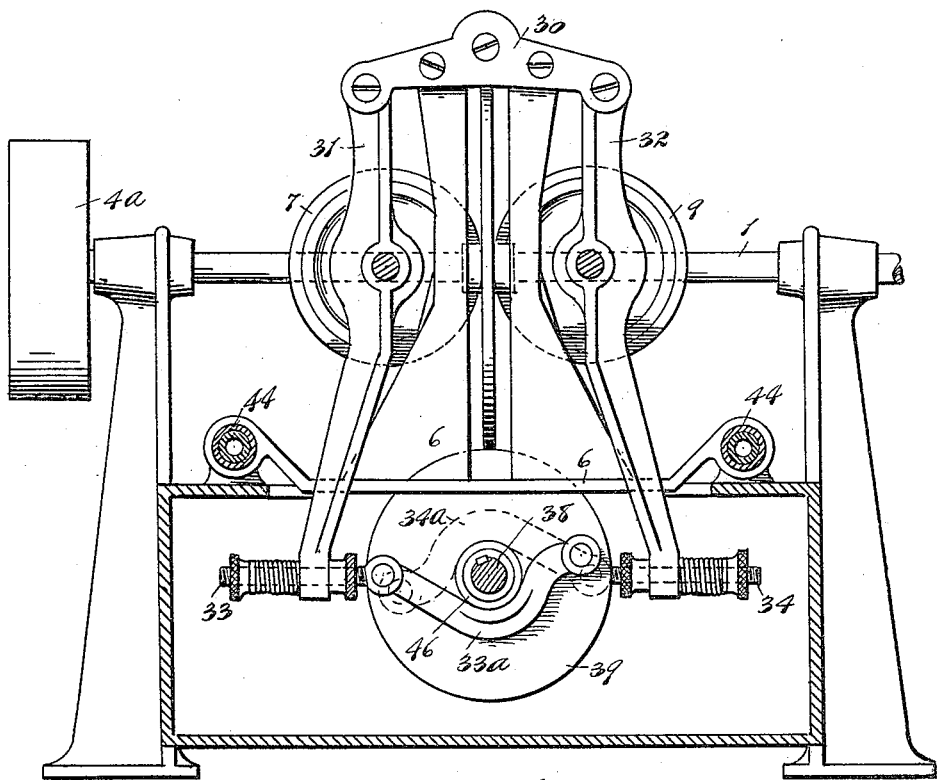
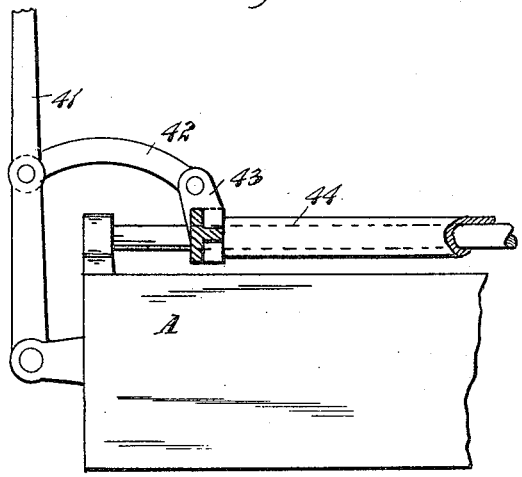

JOSEF THANNHEIMER, OF DETROIT, MICHIGAN, ASSIGNOR OF ONE-HALF TO JOHN ANDERSON, OF DETROIT, MICHIGAN.

CHANGE-SPEED GEAR.

No. 816,401.   Specification of Letters Patent.   Patented March 27, 1906.

Application filed September 13, 1905. Serial No. 278,888.

*To all whom it may concern:*

Be it known that I, JOSEF THANNHEIMER, a citizen of the United States, residing at Detroit, county of Wayne, State of Michigan, have invented a certain new and useful Improvement in Change-Speed Gear; and I declare the following to be a full, clear, and exact description of the invention, such as will enable others skilled in the art to which it pertains to make and use the same, reference being had to the accompanying drawings, which form a part of this specification.

This invention relates to change-speed gear.

It has for its object an improved mechanism for changing the speed between a driving-shaft and a driven shaft, the change being gradual between fast speed in one direction and a reverse speed which may be equally fast in the opposite direction.

In the drawings, Figure 1 is a horizontal section of the device. Fig. 2 is an elevation (some parts of the frame being in section) of a clamp employed to hold the friction transfer-gear against the disks. Fig. 3 is a side view, partly in section, showing the lever which shifts the friction transfer-gear.

Upon a suitable base and frame A are mounted the primary driving-shaft 1, an intermediate disk-bearing shaft 2, and the ultimately driven shaft 3. The primary shaft 1 has mounted upon it a friction-disk 4 and the belt-wheel 4ª or other means for driving it and a pinion 11. The intermediate shaft 2 has mounted upon it a friction-disk 5 and a pinion 20. The disks 4 and 5 are arranged in the same plane. Upon the frame is mounted a carriage 6, which carries two pairs of friction-wheels. One pair 7 and 8 are on the same shaft, both on the same side of the disks 4 and 5. The second pair 9 and 10 on a common shaft contact the disks 4 and 5 on the opposite side. These friction-wheels are arranged to be brought into strong frictional contact with the disks 4 and 5 or to be moved from contact therewith by a clamp mechanism, (shown in Fig. 2,) which will be explained more at length hereinafter.

The small pinion 11 on the main driving-shaft 1 gears with a large wheel 12 on a drum 13, that is mounted loosely upon the shaft 3. The drum carries within it several shafts mounted in bearings around the shaft 3. These shafts are alike, and a plurality are employed in order that undue wear may be prevented. Each shaft is provided with a pair of gears, one of which, 14, meshes with a gear-wheel 15 on a sleeve 16, that is mounted on the shaft 3 and rotates thereon. The second pinion 18 on the shaft 17 meshes with pinion 19, that is keyed to the shaft 3. On the intermediate shaft 2 is the pinion 20, which meshes with a gear 21 on the sleeve 16. With these systems of gears the shaft 3 may be driven with a speed which is the algebraic sum of the speed that will be given to the drum by the shaft 1 and the gearing connecting it with the drum and the speed that will be given to the sleeve 16 by the shaft 2 and the gearing connecting it with the sleeve. Thus if the shaft 2 be held still the motion given to the shaft 1 will be transmitted through the drum and through the pinions on the shaft 17, which would roll on the gear 15, receiving no change because of the sleeve 16 and would convey to the ultimate shaft 3 only that motion which was due to the motion of the shaft 1; but if any motion now be given to the shaft 2 that motion will be added algebraically to the motion of the shaft 3, increasing it or decreasing it, as the case may be. Of course the relative size of intermeshing gears have their effect. Thus if the shaft 2 be held still the shaft 3 will be turned with the force of the shaft 1, and if the shaft 2 be brought into action the force which now varies the speed of the shaft 3 does not detract from the force carried through to the shaft 3 from the shaft 1; but if there is any loss of force because of imperfect frictional contact such loss effects the variant and not the directly-transmitted force, and if there is any loss because of imperfect friction such loss will tend to counteract the variation or increase the variation rather than to destroy the actual force of the shaft 3. The speed of the shaft 2, which varies the shaft 3, is itself varied by shifting the friction-wheels with respect to the two disks 4 and 5. In order that the friction-grip of the friction-wheels on the friction-disks may be as complete as possible, I provide the clamp shown in Fig. 2.

The friction-wheels 7 and 9 are journaled in swinging hangers 31 and 32, which swing from a cross-bar 30, supported above the frame. The lower ends of these hangers are connected by adjustable links 33 and 34 with links 33ª and 34ª. The inner end of link 33 is pivoted to a link 33ª, which reaches across the face of a disk 39. The inner end of link 34 is pivoted to link 34ª, which reaches across the same disk 39. The links 33ª 34ª are curved to reach around the axes upon which the disk turns and to reach slightly more than half-way around, so that the links pass a "dead-center" when the friction-wheels are brought into close contact with the disks 4 and 5. The spring connection between the links and the hangers prevents this. The friction contact is made by turning the axle 38 of the disk 39 to the position shown in Fig. 2, and release is made by a short reverse turn. The axle 38 is controlled by lever 40. The disk 39 is mounted on a sleeve 46, to which it is keyed or otherwise secured. The sleeve 46 slides on shaft 38, to which it is splined. The shaft 38 is in fixed bearings, in which it is capable of oscillation.

The entire carriage which carries the friction-wheel is shifted quickly by the lever 41, which is fulcrumed to the main frame A and connected by link 42 and ear 43 on the sliding frame 44.

What I claim is—

1. In a change-speed gear, in combination with a plurality of parallel shafts, disks carried thereby and in the same plane, gears carried by said shafts, a driven shaft, gears mounted thereupon and adapted to be actuated by the gears on both of said first-mentioned shafts, and friction-wheels in contact with each side of said disks, substantially as described.

2. In combination with a shaft and a disk carried thereby, a second shaft and a disk carried thereby in the same plane with the first, friction-wheels engaging on both sides of both said disks, a reciprocatory frame carrying both said friction-wheels, means for reciprocating said frame, means for shifting the wheels into and out of engagement with the disks, the said means consisting of a shaft, a disk thereon, links actuating the bearings of said friction-wheels, substantially as described.

3. In combination with a pair of shafts and friction-disks carried thereby, a plurality of friction-wheels on each side of said disks, means whereby said wheels may be moved to a position of motion-transmitting contact with said disks, a driven shaft and means connecting the same with both of said first-named shafts whereby it is simultaneously actuated by both, substantially as described.

4. In combination, a pair of friction-disks, bearings therefor, transfer-wheels frictionally engaging said disks, an oscillating friction-wheel actuator and spring connections between the actuator and the wheels, substantially as described.

5. In combination, a pair of friction-disks, bearings therefor, transfer-wheels engaging said disks on opposite sides thereof, swinging hangers carrying said transfer-wheels, an actuator for said hangers, spring connections between said actuator and said hangers, and means whereby the actuator passes a point of unstable equilibrium and rests at either side thereof in a position of stable equilibrium, substantially as described.

In testimony whereof I sign this specification in the presence of two witnesses.

JOSEF THANNHEIMER.

Witnesses:
MAY E. KOTT,
CHARLES F. BURTON.